April 2, 1957     H. E. BISH     2,787,106
CORN PICKER AND SHELLER CONVERSION UNIT FOR COMBINE
Filed June 2, 1955     4 Sheets-Sheet 1

Harvey E. Bish
INVENTOR.

April 2, 1957 H. E. BISH 2,787,106
CORN PICKER AND SHELLER CONVERSION UNIT FOR COMBINE
Filed June 2, 1955 4 Sheets-Sheet 2

Harvey E. Bish
INVENTOR.

April 2, 1957  H. E. BISH  2,787,106
CORN PICKER AND SHELLER CONVERSION UNIT FOR COMBINE
Filed June 2, 1955  4 Sheets-Sheet 4

Harvey E. Bish
INVENTOR.

BY *Clarence A. O'Brien*
and *Harvey B. Jacobson*
Attorneys

United States Patent Office 2,787,106
Patented Apr. 2, 1957

2,787,106

CORN PICKER AND SHELLER CONVERSION UNIT FOR COMBINE

Harvey E. Bish, Giltner, Nebr.

Application June 2, 1955, Serial No. 512,846

4 Claims. (Cl. 56—18)

This invention comprises novel and useful improvements in a corn picker and sheller conversion unit for combines and more specifically relates to an adapter or conversion unit for assembling into a single apparatus a conventional harvester combine and a conventional corn picker or snapper unit whereby the combine may be adapted and modified for performing the joint functions of picking and shelling corn.

The principal object of this invention is to provide a relatively inexpensive and easily applied attachment or conversion unit whereby a conventional harvester combine may be economically adapted for harvesting and shelling corn.

A further important object of this invention is to provide a means whereby a conventional harvester combine and a conventional corn picker may be operatively connected in order that the joined apparatus may in a single operation pick and shell ears of corn.

More specifically, it is the prime purpose of this invention to provide an improved apparatus for harvesting and shelling corn wherein the heretofore separate operations of picking or snapping corn and the shelling thereof, as performed by separate machines may be combined into a single apparatus with a saving of labor and the cost and operation of the machinery.

Yet another object of the invention is to provide a conversion unit whereby the cutter bar assembly of a conventional harvester combine may be replaced with a corn picker and snapper unit in order that the conventional threshing mechanism of the harvester combine may perform the functions of shelling the ears of corn after the picker and snapper unit has gathered the same.

A further specific object of the invention is to provide a conversion unit as set forth in the foregoing objects which may be quickly applied to or removed from a conventional harvester combine for adapting the same for the purpose of picking and shelling corn, with a minimum of labor and time being required for the conversion of the harvester combine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is a partly diagrammatic view showing the manner in which the picker and snapper unit is power operated from the feeder of the harvester combine.

Figure 1:
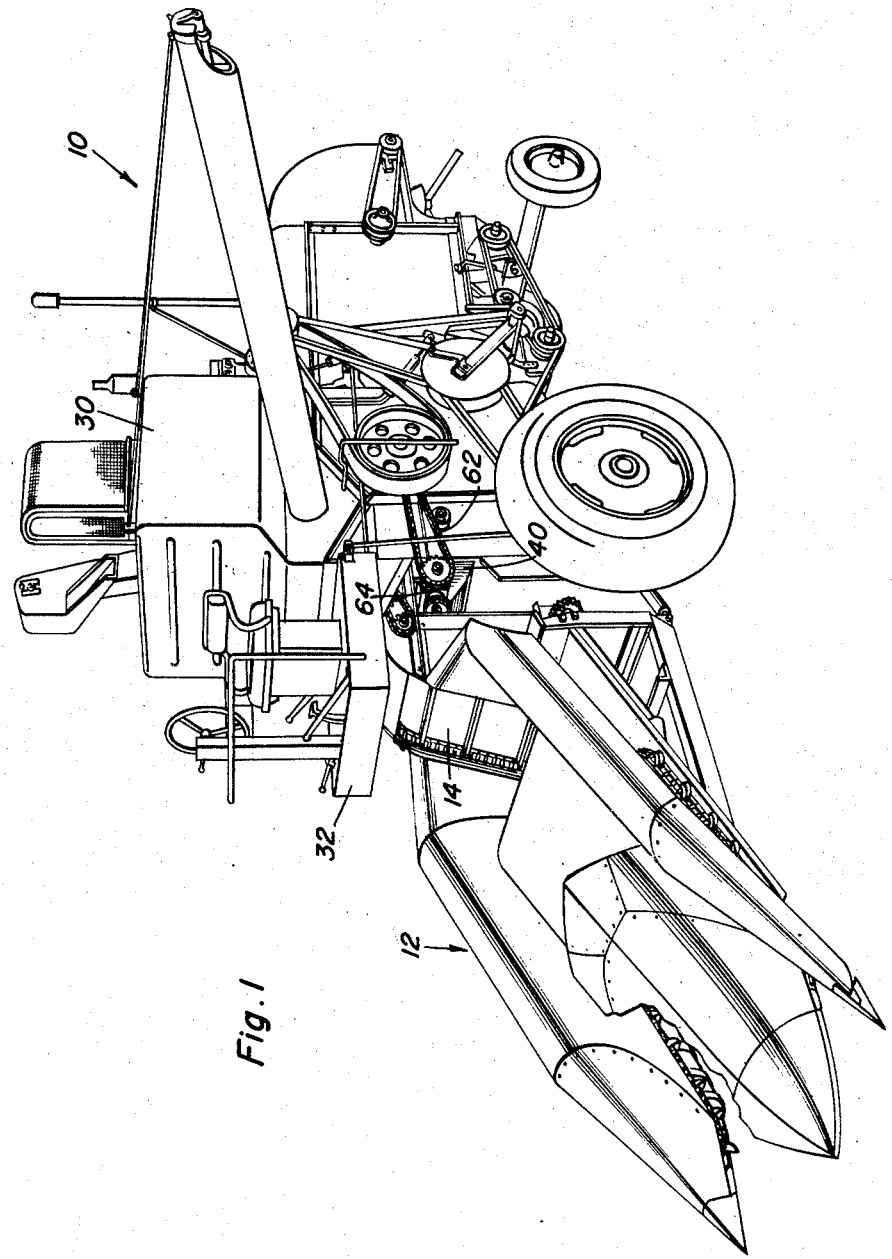
Figure 1 is a perspective view of a harvester combine having the corn picker and snapper unit combined therewith in accordance with this invention, a part of the snapper unit being broken away to show the snapper rolls of the same.
Figure 2:
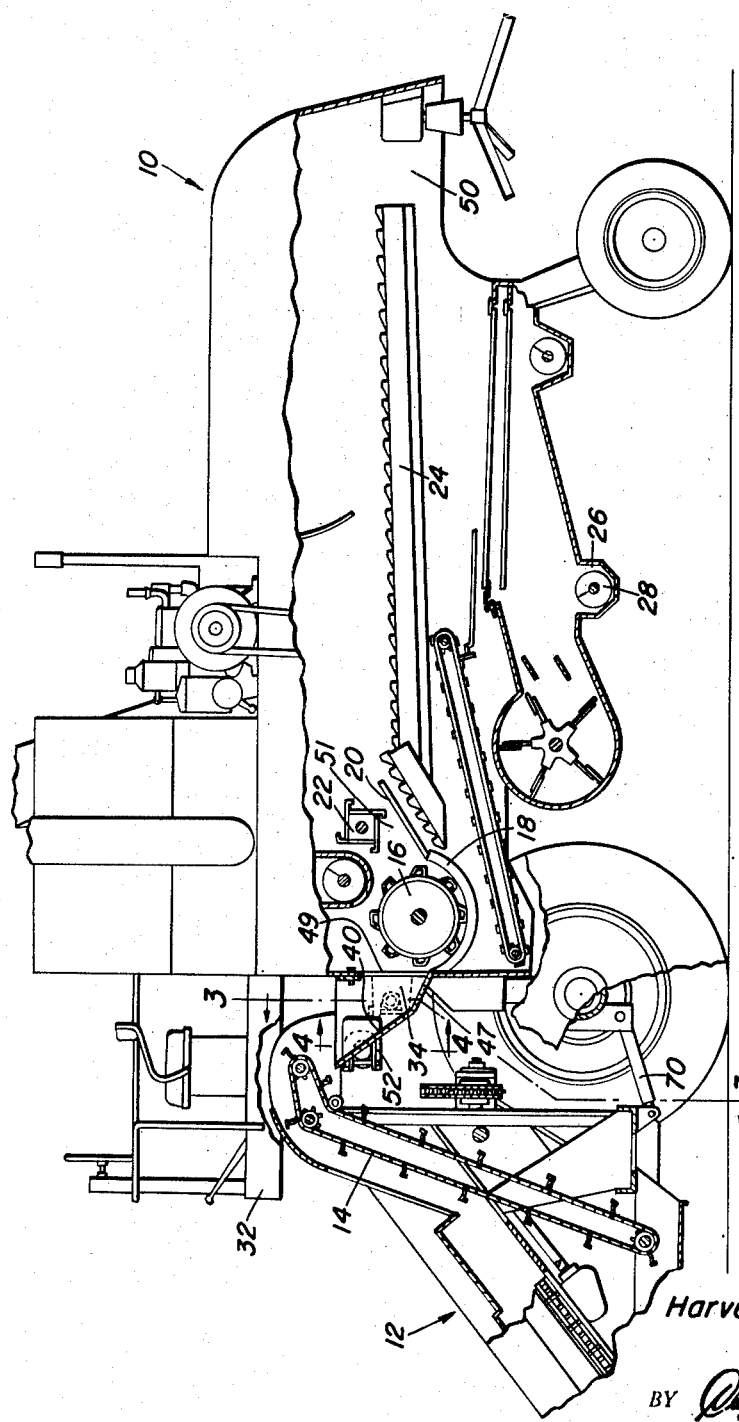
Figure 2 is a side elevational view, parts being shown in section, of a portion of the apparatus of Figure 1, a part of the casings of the harvester combine and of the picker and snapper unit being broken away to show the internal mechanism of the same.
Figure 3:
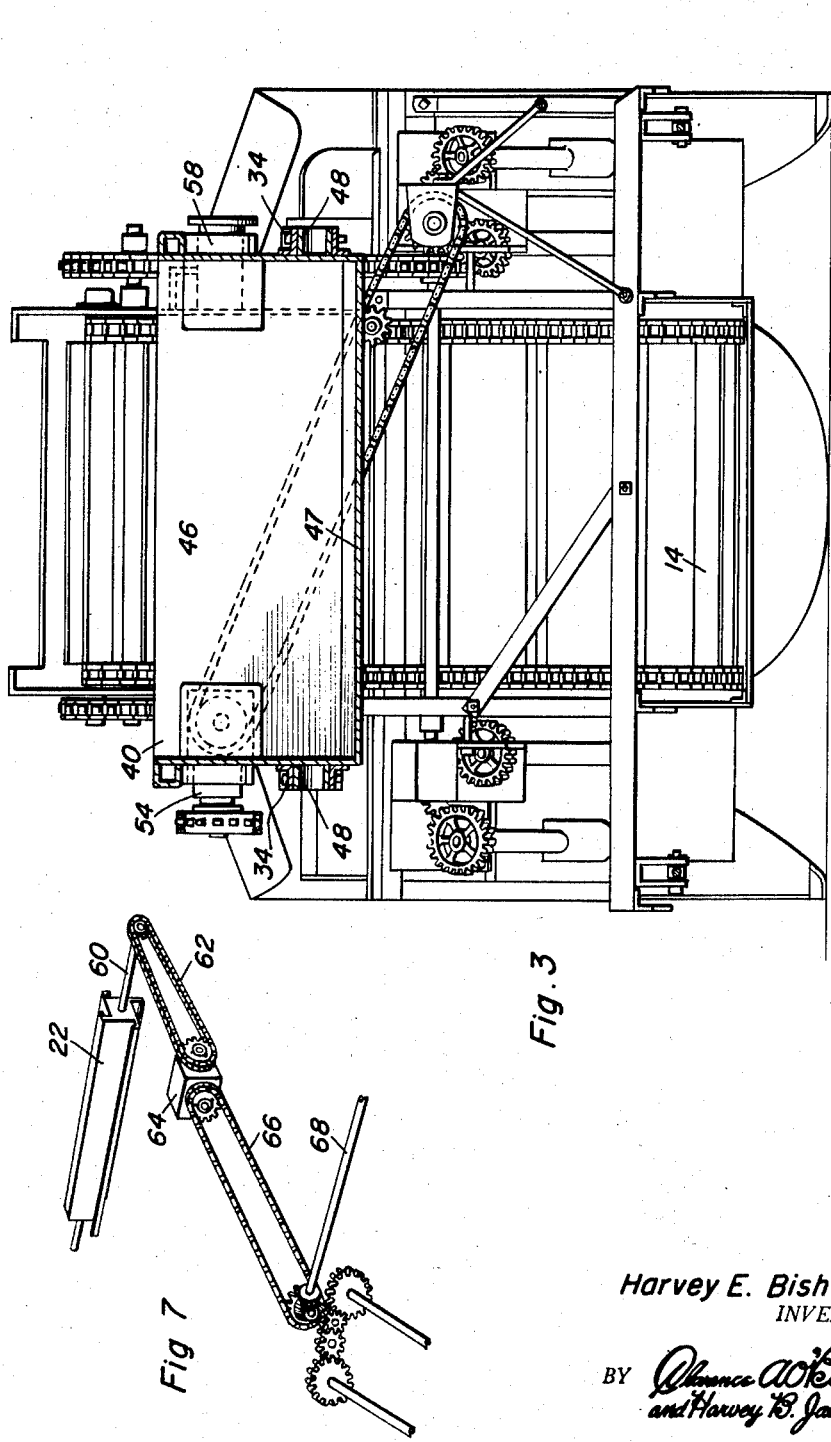
Figure 3 is a vertical transverse sectional view taken upon an enlarged scale substantially upon the plane indicated by the broken section line 3—3 of Figure 2 and showing some of the drive mechanism of the combined apparatus.

Shown in Figures 1 and 2 and indicated generally therein by the numeral 10 is a conventional harvester combine, the particular apparatus illustrated being the well known John Deere self-propelled No. 55 harvester combine now in public use in the industry. In accordance with the purpose of this invention there is provided an adapter or conversion means whereby a conventional form of a corn picker and snapper unit 12, such as the well known Case two row corn picker or snapper, may be connected to a combine, whereby the modified apparatus will perform the joint functions of picking and snapping the ears of corn by means of the picker or snapper unit, and will then shell the ears of corn by means of the harvester combine unit. While the principle of this invention may be applied to other types of combines, the conversion mechanism illustrated and claimed here is particularly adapted to the construction of the harvester combine known as the John Deere No. 55 self-propelled harvester combine, although it is believed that numerous other types and makes of picker and snapper units may be operatively connected thereto.

Since this particular type of harvester combine is well known, a detailed description of the same is deemed to be unnecessary. Briefly, however, the operation and functioning of the harvester combine and the particular parts of the same which are of significance for the purposes of this invention, are as follows. In the conventional type of harvester combine illustrated, the cutter bar assembly, not shown, but which is to be replaced by the picker roll and snapper unit 12 in accordance with this invention, cuts and delivers the grain to the feed conveyor 14 which in turn delivers the grain to the threshing cylinder 16 by means of which the grain is threshed. The straw and grain pass over the grate assemblies 18, the straw then being delivered by the fingers 20 past the wing beater or separating beater 22 onto the straw walkers or agitating screens or beds 24.

During its passage beneath the threshing cylinder 16 and the wing beater 22, most of the separation of the grain and straw in the harvesting combine takes place. Additional separation occurs on the agitating screen 24. The grain falling beneath the grate bars 18 and the agitating screen 24 is eventually collected in an auger trough 26 and is conveyed by the auger screw 28 into the grain storage bin 30. This is the conventional structure and the conventional mode of operation of this particular type of harvester combine.

The two row corn picker and corn snapper unit 12 is of a conventional design and is not modified for the purposes of this invention, it being merely necessary to remove its power operating means and its mounting in order to mount it by means of the novel adapter or conversion unit forming the subject of this invention, upon the harvester combine in place of the customary cutter bar assembly.

In the conventional harvester combine, disposed beneath the operator's platform 32, there are disposed a pair of U-brackets 34 which are employed to receive and support trunnions upon the cutter bar assembly, not shown, whereby the latter is detachably mounted upon the harvester combine. Customarily, the cutter bar assembly is removed from the combine in order to facilitate transportation of the combine over roads and the like.

In the present invention, use is made of these brackets to mount an adapter chute 40 to the harvester combine, which chute in turn serves to support and detachably mount the picker and snapper unit 12 and to receive ears of corn collected thereby and deliver this corn to the harvester combine.

Figure 5:
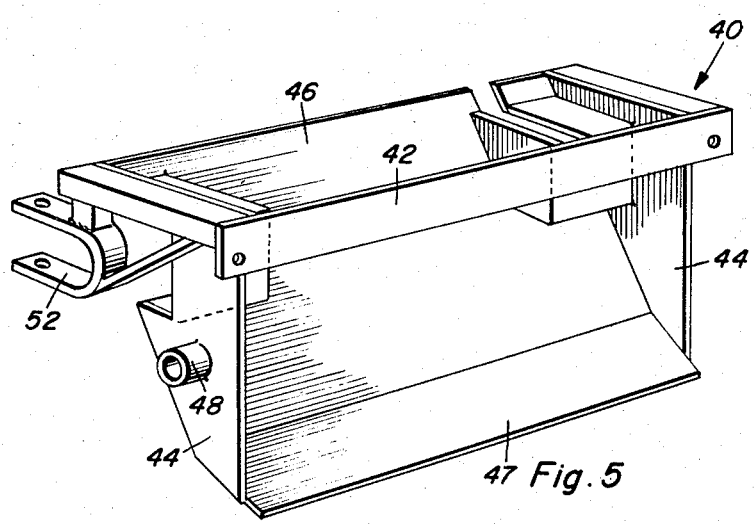
Figure 5 is an enlarged perspective view of an adapter chute forming an essential feature of the conversion unit in accordance with this invention.
Figure 6:
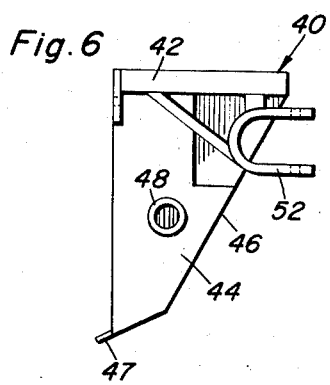
Figure 6 is an end elevational view of the chute of Figure 5.

Referring now specifically to Figures 5 and 6 it will be seen that the chute or bucket 40 forming the conversion unit consists of a top supporting frame 42 having a pair of vertical, parallel side walls 44. An inclined front wall 46 is connected to the side walls and extends up to the top of the frame 42. An apron or lip 47 at the lower end of the front wall 46 extends into the conventional opening 49 into the threshing chamber 51 of the combine. This assembly constitutes a chute whereby ears of corn dropped into the open top of the same may be discharged from the opening at the back and bottom of the same and which registers with the opening 49. Extending from the side walls 44 are a pair of trunnions 48 which are adapted to be received and secured in the above mentioned brackets 34. Thus, the chute forming the conversion unit may be detachably secured to the harvester combine and positioned to discharge the material dropped in the upper end of the chute by the snapper and picker unit into the combine below the threshing cylinder 16 as shown in Figure 2.

At the upper forward portion of the conversion unit 40 there are also provided a pair of U-brackets 52 by means of which the snapper and picker unit may be detachably secured by any suitable means by its supporting trunnions to the combine in operative relation to the conversion unit and the combine threshing mechanism.

By the use of this conversion unit, picked ears of corn are fed into the cleaning and separating mechanism of the harvester combine through which it passes in the same manner as harvested grain, the kernels being shelled from the ears and collected and stored in the bin 30, while the cobs and husks will be discharged from the discharge opening 50 at the rear end of the combine.

Figure 4:
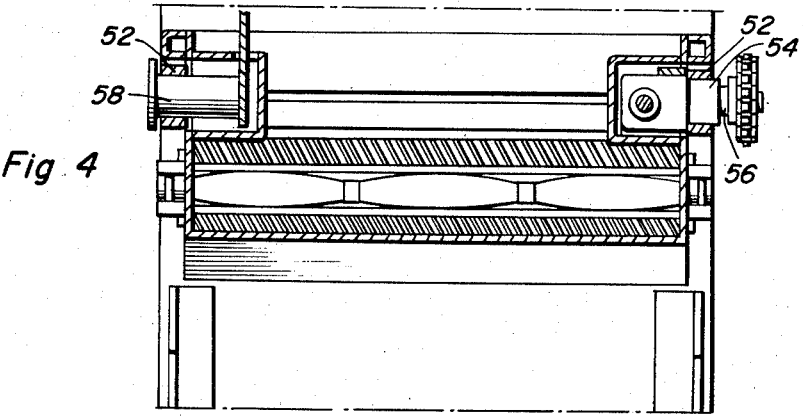
Figure 4 is a vertical transverse sectional view taken upon an enlarged scale substantially upon the plane indicated by the section line 4—4 of Figure 2.

At its upper end the picker and snapper unit 12 includes oppositely disposed laterally extending members respectively consisting of a housing 54 for the stub axle 56 and a trunnion 58. The housing 54 and the trunnion 58 are received in the U-brackets 52, and are retained therein by any suitable fastening means, as will be apparent from Figures 2 and 4, whereby the upper end of the picker and snapper unit 12 is detachably mounted upon and secured to the conversion unit 40. The arrangement is such that the ears of corn gathered by the snapper and picker unit 12 are delivered to the conveyor chain 14 and discharged into the top of the hopper or chute 40. Thus, the snapper and picker unit 12 is detachably secured to the conversion unit which in turn is detachably mounted on the harvester combine, the latter serving to structurally as well as functionally connect these two conventional agricultural harvesting apparatuses.

Originally, the snapper and picker unit was driven by the power take-off of a tractor or other source of power. When, however, this unit is attached to the harvester combine in the present invention, provision is made for powering the same from the latter. As will be best apparent from the diagrammatic view of Figure 7, power is taken from the wing beater 22 for operating the snapper and picker unit. Thus, the shaft 60 which drives the wing beater 22 is employed to drive a sprocket chain 62, which in turn through a gearing assembly 64 of any conventional design, not shown, is employed to operate the sprocket chain 66 disposed at right angles to the chain 62. The chain 66 in turn operates the shaft 68 which operates the elevator chain 14 and which in any suitable manner may operate the stub axle 56 powering.

Thus, provision is made for powering the snapper and picker unit from the power driving system of the harvester combine.

It will be observed that the same hydraulic ram 70 which is part of the conventional equipment of the harvester combine and was employed to raise or lower the cutter bar assembly, is now employed to raise or lower the picker and snapper unit.

The adaptation of the conventional picker and snapper unit for use with the harvester combine provides an apparatus having the combined advantages of both machines. Thus, the economies and advantages of the threshing and cleaning operation of the combine, when not employed for harvesting and threshing grain, can effectively be used with substantially no change therein except for changing a gear upon the threshing cylinder 16 to drive the same at half speed, for effectively shelling the corn and separating the kernels from the cobs and husks.

A dual function is obtained for the harvester combine, enabling this machine to perform the functions of two separate machines. In addition, the snapper and picker unit may be elevated by the hydraulic ram, thus greatly improving its operation in fields which lie upon slopes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conversion unit for operatively and structurally combining a conventional corn snapper and picker unit with a conventional harvester combine of the type including a threshing chamber having threshing and grain separating mechanisms therein, mounting brackets for receiving the trunnions of a harvester cutterbar assembly and an opening into said chamber, said conversion unit comprising; a chute including end walls and an inclined front wall extending from the open top about the edges of the end walls and to an open back, trunnions on said chute for reception in the mounting brackets of the combine for supporting the chute with its open back registering with the chamber opening of the combine, brackets on said chute for supporting the upper portion of said conventional corn snapper and picker unit whereby to receive in its open top ears of corn gathered by said snapper and picker unit.

2. The combination of claim 1 including a gearing assembly for supplying power from the harvester combine to the corn snapper and picker unit, said gearing assembly being operatively connected to the wing beater of the combine.

3. The combination of claim 1 wherein said trunnions are mounted on said end walls and project laterally therefrom.

4. The combination of claim 1 wherein said brackets extend forwardly of said end walls and said front wall and to one side of said end walls.

References Cited in the file of this patent

UNITED STATES PATENTS 2,360,131   Hitchcock _____ Oct. 10, 1944